April 26, 1932.　　J. JANDASEK　　1,855,967
POWER TRANSMISSION
Filed Sept. 8, 1928　　4 Sheets-Sheet 1
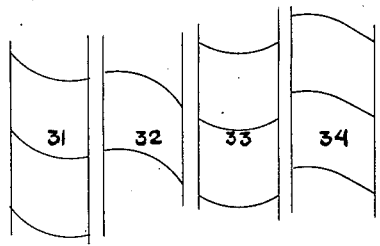
Fig.1.
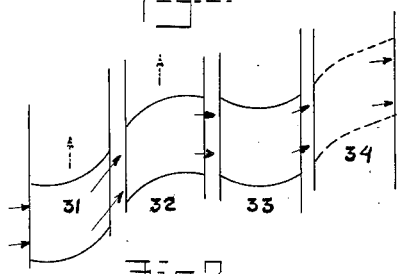
Fig.2.
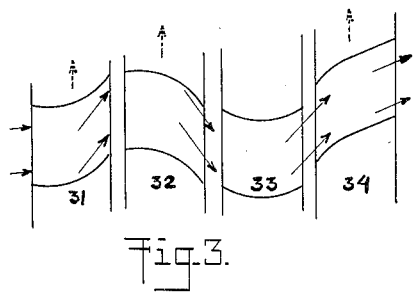
Fig.3.
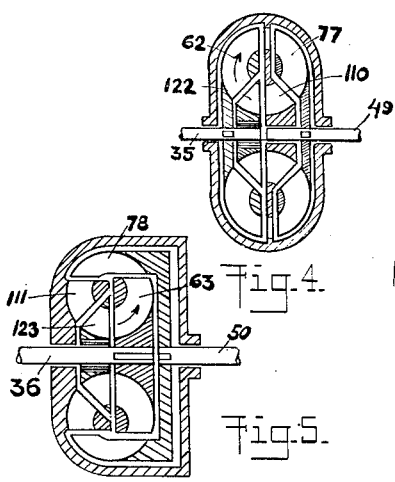
Fig.4.
Fig.5.
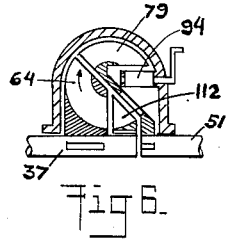
Fig.6.
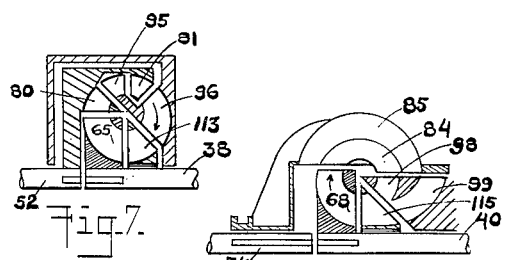
Fig.7.　　Fig.9.
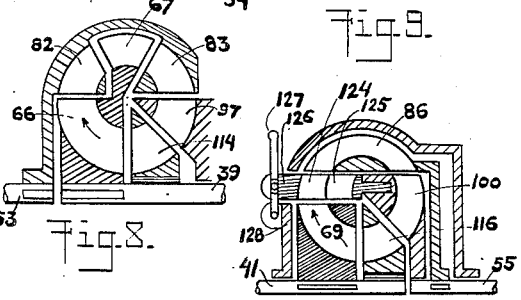
Fig.8.　　Fig.10.
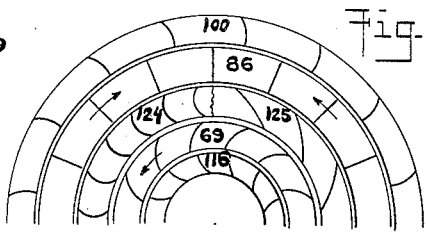
Fig.11.
INVENTOR.
Joseph Jandasek

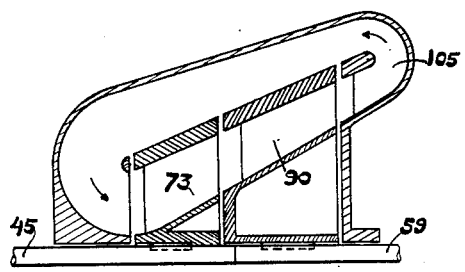
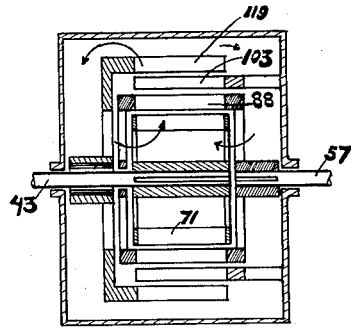
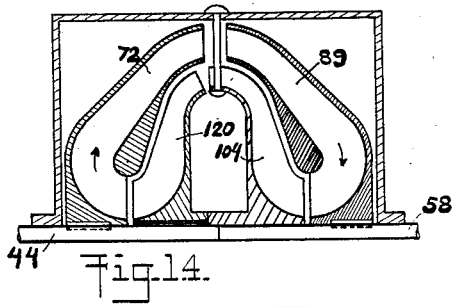
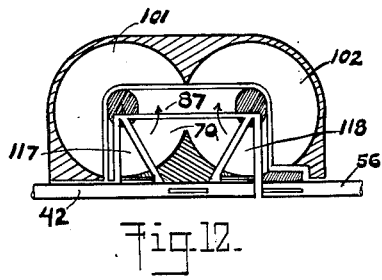
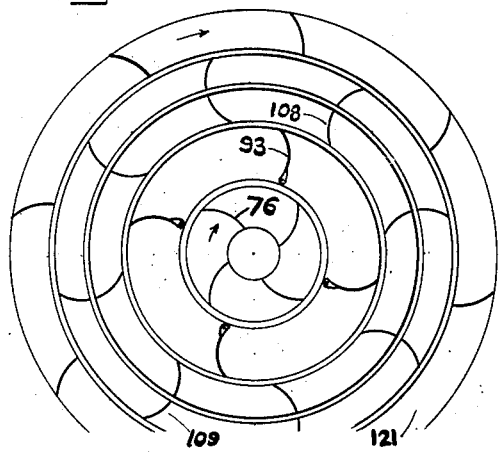
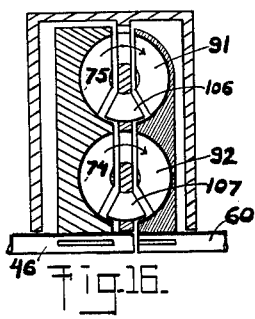

April 26, 1932. J. JANDASEK 1,855,967

POWER TRANSMISSION

Filed Sept. 8, 1928 4 Sheets-Sheet 3

INVENTOR.
Joseph Jandasek

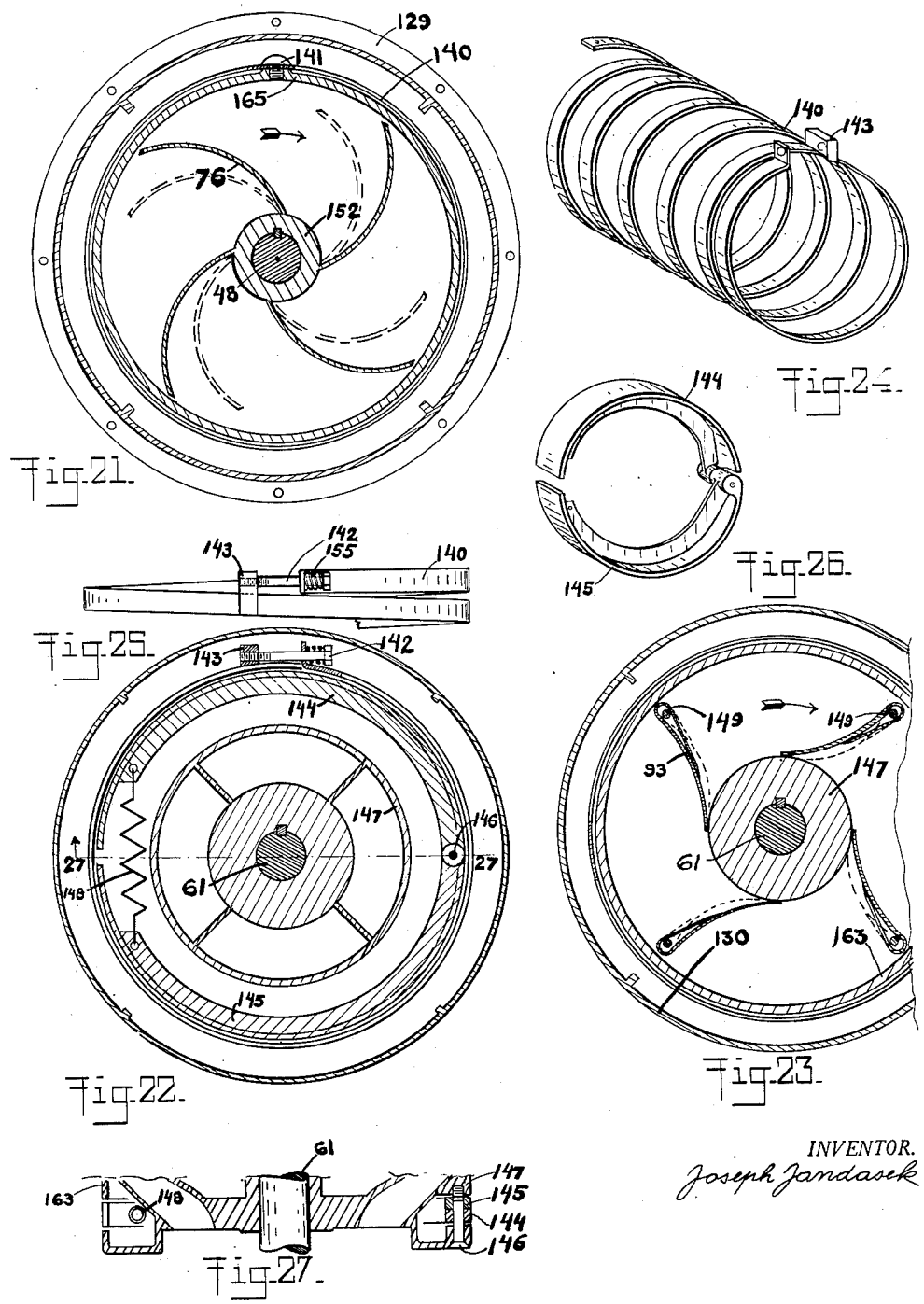

Patented Apr. 26, 1932

1,855,967

UNITED STATES PATENT OFFICE

JOSEPH JANDASEK, OF CICERO, ILLINOIS

POWER TRANSMISSION

Application filed September 8, 1928. Serial No. 304,634.

This invention relates to a new method and apparatus for transmitting power from a primary or power generating member to a secondary or driven member in such a way, that when the secondary member is overloaded, only part of the energy generated by the primary member is absorbed by the secondary member and the remaining energy is returned to the primary member while a forceful torque is created in the secondary member. In this way power can be transmitted very flexibly, that is especially at low speeds or when starting, very high torque can be created in the secondary member, while the torque of the primary member remains practically constant but the speed of the primary member is increased due to the accumulation of the energy which was not absorbed by the secondary member. This new method also permits variation of the number of revolutions and variation of the turning moment of power transformers, and variation of the ratio of gearing. Said primary member is connected directly or indirectly to a power engine or other power source (not part of this invention) from which it receives constantly the rotative energy; the said secondary member is connected to a driven machine (not part of this invention) working with a variable turning moment. The amount of energy absorbed by the secondary member equals: torque multiplied by angular speed of the secondary member; at overloads, however, the angular speed is small and only a fraction of the energy generated by the primary member is absorbed by the secondary member. New rotative energy, however, is being received constantly from the said power engine, therefore accumulation of the rotative energy must arise and consequently the primary member must increase its speed.

The said principle of returning the remaining energy, which was not absorbed by the driven member, back to the generating member can be applied advantageously to electrical, pneumatic, and especially to hydraulic power transmission.

In each case it consists principally of a driving or generating member connected to a power engine, main driven member or main motor, and an auxiliary driven member or auxiliary motor. Power is transmitted from the generating member to the main motor, where at normal loads all of the said power is consumed and at overloads only part of the said power is consumed owing to the retardation of the said motor and the remaining part of the said power, which was not absorbed by the main motor, is transmitted to an auxiliary motor to be absorbed; this auxiliary motor is finally connected to the generating member in such a way that it helps propel the same with the result, that all of the said remaining part of the power, neglecting losses, is transferred back to the generating member. At the same time the said generating member receives energy from a power engine, consequently the energy accumulates.

In an extreme case, when the driven member is so much overloaded that it stops revolving, there is no energy absorbed by the main motor although a forceful turning moment is being produced in said motor, and consequently all the energy, neglecting losses, comes back to the generating member and helps propel the same. In response to the action of this power transmitting method and due to accumulation of the energy, the speed of the generating member increases without necessity to increase the turning moment of the said generating member. Consequently more power is being transmitted to the main motor and greater torque produced therein. If this increased power is not sufficient to speed up the main motor, there will be more power not absorbed by the main motor, consequently more power is transferred to the auxiliary motor, which in turn helps to increase the speed of the generating member still further, and so on until the main motor is brought to such a speed that the energy absorbed by the main motor plus the energy lost in friction equals the amount of energy brought to the generating member from the above mentioned power engine. When the main motor is brought to such a speed that all the energy transmitted from the generating member is absorbed by the main motor, the auxiliary motor ceases to function, the normal conditions of power transmission are reached. At any moment that the driven member becomes retarded, part of the energy is transferred to the auxiliary motor and through it back to the generating member, speeding up the same and producing automatically greater torque in the main motor until the same is brought to its proper speed again.

This invention provides a rotary mechanism for the transmission of power at varying speeds such that from any applied driving speed and torque a driven speed and torque are obtained of which the torque varies automatically in accordance with the load and the speed varies inversely as the torque, the efficiency being high throughout the whole range of speed.

If there were no friction and no other losses the speed of the generating member as well as the torque transmitted to the main motor could be increased infinitely. In other words, the ratio of such gearing and the turning moment of the driven member would be infinite. In practice, however, there is friction and other losses, thus the gearing ratio will depend on the efficiency of the transmitter. The better the efficiency of the transmitter, the higher the gearing ratio that can be obtained. The torque of the driven member developed by this method can easily be several times greater at overload than at normal speed. This means that a torque converter constructed on the above described principle is especially adapted for propelling of motor vehicles, locomotives, and other machines requiring high starting moments.

The main object of my invention is to increase automatically the turning moment in the driven member whenever necessary, as, at start, at low speeds, or at overloads. Another object is to utilize all the energy without destroying any part of it and to maintain the efficiency of the converter substantially constant within a broader speed range.

Another object of the present invention is to provide an automatic and positive connection of the driving and the driven member so as to obtain a direct or a "high speed", whereby practically all transmission losses are eliminated.

It is also an object of the present invention to illustrate the application of the above mentioned principle of automatic increase of the turning moment of the driven member to a hydraulic power transmission and also to provide a new and useful power transmission embodying novel features of construction, wherein a fluid serves as the power transmitting medium and the said fluid energized by the primary member, effects a rotation of the fluid impelled member.

More particularly this invention relates to the hydraulic transmitting apparatus of that type in which a pump impeller energizes a fluid, which fluid in turn produces a desired rotation of the turbine runner, both by the fluid velocity energy and by the fluid pressure energy. Said fluid is then directed back to the pump and another cycle of fluid circulation starts.

It is also an object of my invention to overcome all the difficulties and reasons, why other forms of hydraulic transmissions heretofore designed and built, failed to be used in practice to any large extent. Those reasons are:

First, because of the heat produced and because of the efficiency it is impractical to convert mechanical energy into hydraulic and back again on long nonstop trips; in other words, practice requires a "direct drive".

Second, in transmitters consisting of centrifugal pump and turbine increase in turning moment at overloads is not sufficient, because, when a turbine rotates slowly, it discharges fluid directly against the vanes of the pump; the velocity energy of the fluid which was not absorbed by the turbine forces the pump to slow down. Consequently the available torque of the turbine is greatly diminished.

Third, it is a characteristic feature of the centrifugal pump directly driving a reaction turbine to overload when the turbine rotates slowly due to the excessive quantity of flowing liquid.

Because of these reasons hydraulic transmissions were not practical and therefore could not gain any foothold in the past. While in hitherto known designs as for instance Föttinger transmitters, see Patent No. 1,199,359, braking of the driven member, so as to prevent said member from rotation, results in a turning moment amounting to about one and one-half times the moment acting at the most favorable speed, a braking of the driven member of the apparatus designed according to the above described principle, will result in a considerable and automatic increase of the turning moment up to a magnitude several times as large as the normal turning moment, while maintaining the efficiency substantially constant within a broader speed range.

To attain the above mentioned objects I have interposed in my hydraulic transmission between the outlet from the turbine runner and the inlet of the pump impeller a fluid guiding and redirecting member and an auxiliary turbine runner. The said guiding member is to redirect the flow of liquid from the turbine runner to the auxiliary turbine runner in such a way as to effect rotation of the auxiliary turbine runner whenever there is any kinetic and pressure energy left in the circulating fluid after it is discharged from the main turbine runner.

Another object of my invention is, at overloads, to automatically decrease the effective diameter of the pump, diminish the quantity of energized fluid and consequently keep the turning moment of the driving member comparatively small while the turning moment of the driven member increases.

It is also an object of the invention to stop the circulation of the liquid when using "direct drive" in order to prevent heating up of the liquid.

With these and other objects in view, my invention consists in the combination, arrangement, and construction hereinafter described, claimed, and illustrated in the accompanying drawings, it being understood that many changes may be made in the size, proportion of the parts and details of construction within the scope of the appended claims, without departing from the spirit or sacrificing advantages of the invention.

Some of the many possible embodiments of the invention are illustrated in the accompanying drawings. Each consists basically of a driving and driven member, redirecting vanes and auxiliary driven member in which:

Figure 1 illustrates a diagrammatic development of the absolute shape of vanes at standstill in my hydraulic power transmission.

Figure 2 represents the relative shape of the vanes and the direction of the fluid flow at normal speed (same transmission Figure 1).

Figure 3 shows the relative shape of the vanes and the direction of the fluid flow at low speed in the same transmission. The full line arrows indicate the direction of the movement of the fluid.

Figures 4 and 5 are sectional views diagrammatically illustrating two forms of my apparatus, consisting of pump impeller, turbine runner, stationary redirecting guide wheel, auxiliary turbine runner and stationary casing.

Figure 6 is a sectional view diagrammatically showing the form of my apparatus equipped with redirecting vanes which are pivoted and adjustable to obtain maximum efficiency.

Figure 7 is a view of the transmitter with a single stage driving member but with two stage driven member adapted to produce a considerable reduction of speed, and Figure 8 represents a form with two stage driving as well as two stage driven member.

Figure 9 is a sectional view diagrammatically illustrating a form of my transmission in which the fluid driven member is axially shiftable and has two sets of passages to either of which circulating fluid can be guided, in order to obtain two different ratios, both of maximum efficiency.

Figure 10 represents my apparatus equipped with axially shiftable non-rotatable guide wheel, interposed between the outlet of the pump impeller and inlet of the turbine runner, for the purpose of controlling the direction of the flow and reversing the direction of the rotation of the turbine runner.

Figure 11 is a diagrammatic view showing: on the right hand side, the curvature of the vanes through which the operative medium flows in the circuit formed when the guide wheel of Figure 10 is in location for "ahead"; on the left hand side, showing the curvature of the vanes, through which the operative medium flows in the circuit formed when the guide wheel of Figure 10 was shifted to location for "reverse".

Figure 12 illustrates diagrammatically my transmission with double circuit of fluid.

Figure 13 is also a transmission with dual circuit, but equipped with a most simple construction of vanes i. e. rectangular blades.

Figure 14 illustrates still another form of my apparatus.

Figure 15 shows a form of my transmission, in which for the sake of simplicity the auxiliary driven member vanes were made integral with driving member vanes.

Figure 16 has also the driving member and an auxiliary driving member integral, but has two independent fluid circuits.

Figure 17:
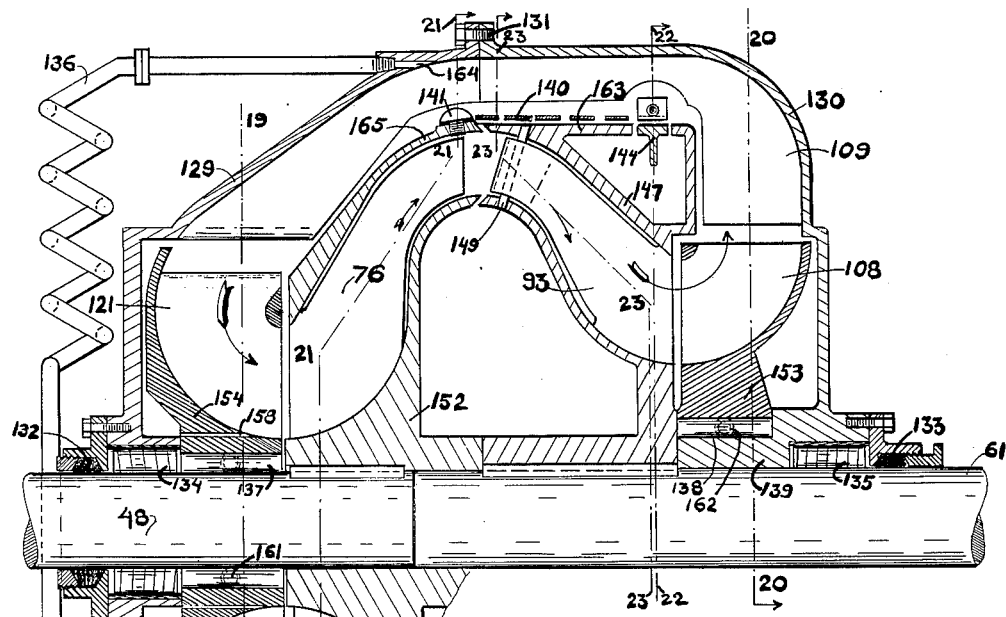

Figure 17 is a longitudinal section of one half part of a hydraulic transmission constructed in accordance with my invention and Figure 18 is a diagrammatic development showing the vanes of the apparatus as drawn in Figure 17.

Figure 19:
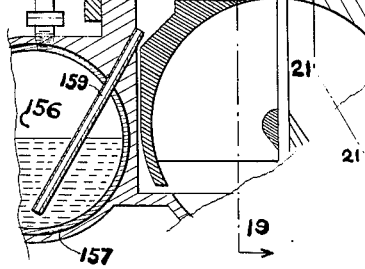

Figure 19 is a vertical section in a smaller scale taken on line 19—19 of Figure 17.

Figure 20:
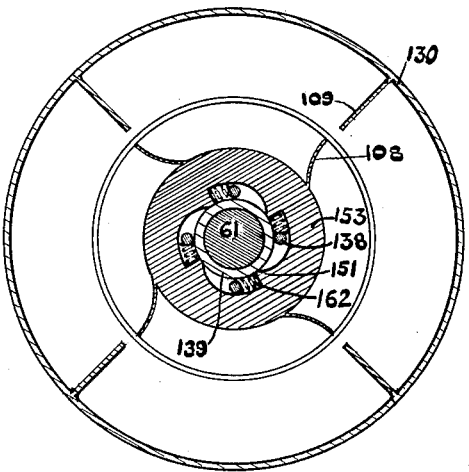

Figure 20 is a vertical section in a smaller scale taken on line 20—20 of Figure 17.

Figure 21 is a vertical section in a smaller scale taken on line 21—21—21—21 of Figure 17.

Figure 22 is a section taken on line 22—22 and Figure 23 a section on line 23—23—23—23 of Figure 17.

Figure 24 illustrates construction of spiral spring which is used as a friction clutch for "direct drive".

Figure 25 is a top view on the end of the same spring.

Figure 26 illustrates the friction shoes of the centrifugal clutch.

Figure 27 shows section taken on line 27—27 of Figure 22 showing hookup of the said shoes.

My hydraulic transmission in each and all of its forms includes a pump mounted on a primary or driving shaft, a main hydraulic motor or turbine mounted on a secondary or a driven shaft, an auxiliary hydraulic motor or turbine and stationary redirecting passages, interposed between the outlet of the said main motor and the inlet of the said auxiliary motor. The said four parts are arranged in such relative positions that their passage systems comprise the main and complete circuit in which the said fluid is capable of circulating and transmitting power.

Part of the circulating fluid is by passed through a coil or other suitable cooler in order to be cooled off and is then delivered back to the main circuit.

In the main or power transmitting circuit the operative fluid circulates continuously, flowing through the pump into the main turbine, then through the guide passages into the auxiliary turbine and finally back to the pump again. The operative fluid receives energy in the pump and transmits it all, at normal speed, to the main motor or turbine. When starting or at low speeds this energy is not absorbed completely by the said main motor or turbine due to retardation of the said motor, so the remaining energy is transmitted to the auxiliary motor or turbine by means of the guide passages. Turning moment from the auxiliary motor or turbine is then transmitted by means of suitable mechanism, for instance, a ratchet, back to the driving shaft, thus relieving said shaft of overload and increasing its rotative speed. There is certain amount of rotative energy constantly received by the pump impeller from a power engine. Only a small amount of the said energy, at overloads, is absorbed by the main turbine, therefore accumulation of rotative energy in the pump impeller and in the operative fluid must take place, hence the impeller revolves faster and the fluid rotates and circulates more rapidly. Finally a larger quantity of the fluid (per second) rotating at a higher rate of speed produces a heavier torque in the main turbine at overloads, than a smaller quantity of the fluid (per second) rotating slowly at normal loads. This increase of torque is the main object of the present invention. There is no energy lost at low speeds except through friction, as compared for instance to the gas engine, where all the energy of the expanding gases not absorbed by the piston is discharged and lost in the air or, as compared to the electrical motor, where the larger part of the energy, in starting, must be absorbed in rheostats.

In general the primary or secondary shafts may be arranged in any desired relative positions, intersect at an angle, or run parallel. The most important arrangement, however, is coaxial position. The said pump can be of centrifugal, gear, propeller, piston or any other type. The said motors can be of turbine, impulse or reaction, gear, propeller, or some other type.

In order to make the idea of my invention clear, I have illustrated in Figure 1 a diagrammatic development or the absolute shape of the vanes of my apparttus at standstill, in Figure 2 the relative shape of the vanes at normal speed, in Figure 3 the relative shape of the vanes at starting. In these figures numeral 31 indicates the driving vanes with the entrance angle determined for the most efficient operation at normal speed, 32 the driven vanes, 33 the redirecting vanes, and 34 the auxiliary driven vanes with the entrance angle determined for the most efficient operation at overloads. At normal speed the rotative velocity energy of the fluid is absorbed by the driven vanes 32 and therefore the said auxiliary vanes 34 are not active and consequently are shown dotted in Figure 2. At the normal speed of the driven vanes 32, the auxiliary vanes 34 are merely carried with the stream of the fluid at the rotative speed which is slower than the rotative speed of the driving vanes 31; this speed of the auxiliary vanes depends on the direction and the velocity of the fluid, after the fluid was discharged from the guide vanes 33, and upon the angle of the auxiliary vanes 34 relatively to the direction of the fluid; if this angle is small, the rotative speed of the vanes 34 is little, if this angle is large, the rotative speed of the vanes 34 is great. At the same time the greater the velocity of the fluid, the greater the speed of the vanes 34. At overloads the velocity of the fluid is great, hence the speed of the auxiliary vanes is also great; at normal loads, however, the velocity of the fluid is small, and consequently the speed of the auxiliary vanes is also small.

At start (see Figure 3) the fluid discharged from the driven vanes 32 still possessing pressure and velocity energy, is redirected by stationary guide vanes 33 and finally its energy is absorbed by the auxiliary driven vanes 34. The curvature of the auxiliary vanes is such that the fluid after leaving vanes 34 possesses greater rotative velocity than it possessed when it was entering the driving vanes 31 at the previous cycle, in other words, at overloads the fluid entering into the driving vanes 31 streams partly in the direction of the said driving vanes and a great part of its velocity energy is transmitted directly back to the driving vanes 31. This circumstance partly unloads vanes 31 and allows them to speed up and increase the pressure on the driven vanes 32. At the same time all the turning moment from the auxiliary vanes 34 is also transmitted to the driving vanes 31; this also unloads vanes 31 and allows them to speed up and still further increase the pressure upon the driven vanes 32, the result being that the difference in the speed of the driving and the driven vanes is greatly increased. If the driven vanes still could not speed up sufficiently, at too great overloads, the fluid would again be discharged with increased velocity into the redirecting vanes and then into auxiliary vanes, causing the driving vanes to speed up further, etc., until the driven vanes are speeded up sufficiently.

If there were no redirecting vanes 33 the fluid at overloads after being discharged with high velocity from the driven vanes would stream directly against the driving vanes and would have a tendency to slow down the driving vanes, because, it is apparent, that not only the driving vanes influence the movement of the driven vanes but the driven vanes influence the movement of the driving vanes as well. Gas engines on motor cars, however, possess only little torque at slow speeds and therefore the available torque of the driven shaft at overloads becomes so little that the type of power transmitter without redirecting vanes is absolutely impractical for propelling of vehicles requiring high starting moments.

In Figures 4 to 23, inclusive, the numerals 35 to 46, inclusive, and 48 indicate primary or driving shafts which are connected to power engines or other sources of energy (not shown); the numerals 49 up to 61, inclusive, indicate secondary or driven shifts; numerals 62 to 76, inclusive, primary or driving vanes mounted and secured to primary shafts; numerals 77 to 93, inclusive, secondary or driven vanes mounted and secured to the secondary wheels; numerals 94 to 111, inclusive, redirecting guide vanes, integral with casing; numerals 112 to 123, inclusive, auxiliary driven vanes which are all mounted on primary shafts by means of ratchet mechanism so as to be able to transmit torque in the direction of their rotation to the said driving shaft, but that the driving shaft cannot transmit any torque to the said auxiliary driven vanes. In Fig. 9 the numerals 84 and 85 indicate axially shiftable as well as rotatable turbine blades, entrance and exit angles of the blades 84 are designed to be most efficient at light load and at high speed of the driven shaft 54, circuit of the fluid "for high speed" is shown in Fig. 9. When, however, the driven member is shifted to the right in Fig. 9, fluid discharged from primary vanes 68 will enter into driven vanes 85, and then into guide vanes 99. Entrance and exit angles of the blades 85 are designed to be most efficient at heavy load and at low speed of the driven shaft 54. Function of the vanes 84 is that of high speed turbine blades, function of the vanes 85 is that of slow speed turbine blades.

In Figures 10 and 11 the numerals 124 and 125 indicate axially shiftable but not rotatable guide vanes, 124 for "reverse" drive and 125 for "ahead" drive. Guide wheel 126 integral with passage rings 124, 125 can be shifted by means of lever 127, pivotally secured to a casing 128, thereby bringing either of the passages 124 or 125 into operation. The curvatures of the blades in the passage rings are illustrated in Figure 11.

In Figures 17 to 27 is illustrated a form of my apparatus suitable especially for propelling of vehicles. The numerals 129 and 130 indicate two halves of a stationary closed casing fastened together by bolts 131. Each end of this casing is provided with a stuffing box 132 and 133 and is equipped with bearings 134 and 135 for driving and driven shafts 48 and 61. The numeral 136 indicates a cooling coil. Numeral 156 stands for the fluid storage chamber located below the center line of shaft and consisting of large tank 157 integral with casing 129. There is a tube 159 secured to casing 129 projecting almost to the bottom of the chamber 156. The storage chamber can of course be equipped with fluid gauge indicating the amount of fluid in the chamber.

The auxiliary turbine runner 154, carrying vanes 121 (see Figures 17 and 19) is formed with a toothed rim 150 adapted to be engaged by ratchet rollers 137 held in position by springs 161 and thus it is secured by means of friction to shaft 48 in one direction only, being capable of independent rotation in the other direction. This runner is also equipped with several small holes 158 drilled in a circle close to the center. At standstill the majority of the fluid runs down through the holes 158 into the storage chamber and in this way leakage through the bearings at standstill is eliminated; the large surface of the tank serves also for cooling purposes during operation. When operation starts there is suction created because openings 158 are close to the center of the impeller and the fluid is sucked into the casing 129 and 130 by means of the tube 159 and said holes 158. During operation part of the operative fluid circulates through the upper opening 164 in casing 129 into the cooling coil 136, into chamber 156 and finally through openings 158 back into the main circuit.

The redirecting guide wheel vanes are in this design composed of two parts: first, a stationary set 109, which is integral with housing 129 and 130, second, a rotatable set 108, which is secured to the concentric ring 153, capable of independent rotation in one direction only, i. e. direction of pump impeller, being secured to a hub 139, which is part of the housing 130, by means of a toothed rim 151 (see Figure 20) adapted to be engaged by a ratchet roller 138, the said roller being held in position by a spring 162 and in that way the rim 151 can be secured to the said hub 139 by means of friction in one direction.

A coil spring 140 has one end bolted to the shroud 165 of the pump impeller 152 by means of a screw 141; on the other end of the spring, the last coil is closed to form a split ring and is equipped with block 143, spring 155, and adjustable bolt 142 by means of which this last coil can be more or less contracted or expanded (see Figure 22 and Figure 25).

Concentric with this last coil are centrifugal clutch shoes 144 and 145 (see Figures 22 and 26) pivotally connected by means of bolt 146 to turbine rotor 147. Spring 148 counteracts action of the centrifugal force up to a certain predetermined rotative speed.

Within the casing 129 and 130 is disposed a driving member in the form of a centrifugal pump impeller 152. This impeller is provided with vanes 76, which are adapted to energize the motive fluid and deliver it to a turbine runner 147. These vanes 76 are flexible and have inner ends integral with rotor 152, but outer ends are left free. Vanes can bend at higher torque to the shape which is illustrated by dotted lines in Figure 21, so their effective diameter decreases, fluid exit angle diminishes, and in this way further increase of necessary driving torque is prevented. This pump impeller cannot be overloaded.

The turbine rotor 147 is equipped with flexible vanes 93. The self-adjustable blades made of springy material have front ends bent loosely around pins 149 (see Figures 17 and 23) which pins are rigidly fastened to the walls of the rotor 147. The rear ends of the said blades are rigidly secured to the rotor walls also. Dotted lines illustrate the shape of vanes 93 bent down under heavy pressure at overload. These flexible vanes or blades 93 are adapted to absorb energy from the operative fluid at start or at low speeds as well as at high speed, because they automatically adjust themselves and deflect more or less according to the pressure exerted upon them by the said fluid, and therefore the angle at which the fluid enters into the driven vanes is always equal to the angle of the front edge of the driven vanes.

During operation the operative fluid is delivered from the impeller to the turbine runner and from the turbine runner to the guide wheel ring 153 provided with guides or vanes 108. At start or at low speeds the operative fluid enters into these guides from the front (see Figures 18, 20, and compare with Figure 3) so that guide wheel ring 153 produces a wedging action upon the rollers 138 and the created friction between rollers 138 and stationary hub 139 causes guide wheel ring 153 to lock and become stationary. On the contrary at high speed (see Figure 2) the operative fluid enters into this guide wheel ring from the rear, no wedging action is created due to the form of the toothed rim 151, and the guide ring rotates freely at the speed determined by the blade angle and by the speed of the fluid. There is also spring 162 provided to hold said rollers 138 with slight pressure up against rim 151 always. The purpose of the guide vanes 108 is to increase the efficiency of the apparatus and in this way to increase the gearing ratio.

The operative fluid then enters into the stationary guide vanes 109 which are adapted to redirect the flow of the fluid so as to permit the remaining pressure and velocity energy to be absorbed in the succeeding auxiliary turbine runner 154. At overloads the operative fluid enters into the vanes 121 with high velocity and pressure and produces a turning moment upon the rotor 154, which in turn produces a wedging action upon the rollers 137; created friction between rollers 137 and the shaft 48 transmits the said turning moment to the driving shaft 48. On the contrary at normal speed (see Figure 2) the operative fluid enters into vanes 121 with low velocity and pressure, consequently no turning moment is transmitted to the shaft 48. The result is as if the effective diameter of the impeller were automatically diminished at low speeds and therefore the impeller can revolve faster at low speed of the turbine and revolves slow at high speed of the turbine, and this is what is desired on motor vehicles. The vanes 121 leave part of the energy in the operative fluid to be transmitted directly to the pump impeller; a percentage of this directly transmitted energy can be varied as required by means of the shape of the vanes in the auxiliary runner. The operative fluid then enters into the intake side of the impeller.

In Figure 22 is illustrated a centrifugal clutch for "direct drive".

In operation, when the secondary shaft is at rest or rotates at low speed, the tension of the spring 148 keeps the clutch shoes 144 and 145 together, and the clutch spring 140 does not touch the turbine rotor drum 163. At higher speed of the turbine, however, the centrifugal force of the clutch shoes 144 and 145 overcomes the tension of the spring 148 and the said clutch expands and presses against the inside of the coil spring 140. This created friction twists the coil spring 140, contracts and winds up the same upon the drum 163 and grips it firmly. So at high speeds, the pump impeller operates, by means of the above mentioned friction clutch, the turbine directly. At the same moment the flow of the fluid almost stops because the centrifugal action of the impeller and the runner upon the fluid is about balanced.

The above described action of centrifugal force of shoes 144 and 145 is partly counteracted by spring 155 in this way: the last coil of spring 140, because it revolves with the impeller, opens slightly at high speeds of the impeller and contracts at low speed due to centrifugal force and due to the yielding action of spring 155. Consequently high speeds of the impeller require higher speeds of the turbine before the clutch shoes 144 and 145 expand and the coil spring 140 grips. The result of this action is: when an extra large turning moment is required all that is necessary, is to speed up the impeller and the clutch does not engage so soon, preventing the operation of the turbine by "direct drive"

and giving more time for speeding up the secondary shaft.

What I claim is:

1. A hydraulic apparatus for transmitting power, comprising a path for fluid including a pump impeller mounted on a driving shaft, a turbine runner mounted on a driven shaft, guide vanes adapted to increase the rotating speed of said impeller, auxiliary driven vanes interposed between the exit from said guide vanes and the entrance to said impeller, said auxiliary vanes being rotatably mounted on said driving shaft and adapted to yield to fluid impinging on their backs and unyielding relatively to said first shaft to fluid impinging on their faces.

2. An apparatus for transmitting power, having primary means adapted to generate energy, secondary means capable of absorbing said energy, auxiliary means, means to transmit the remaining part of energy, not absorbed by said secondary means at overloads, to said auxiliary means, the latter capable of receiving said remaining part of energy not absorbed by said secondary means and capable of transforming said remaining energy into energy applicable directly to the rotation of said primary means, said auxiliary means being adapted to be locked to said primary means so as to rotate therewith or be released therefrom so as to rotate independently thereof.

3. An apparatus for transmitting power as embodied in claim 2 and including means for connecting said primary means and said secondary means so as to operate together or for disconnecting said means so as to operate independently.

4. An apparatus for transmitting power as embodied in claim 2 and including connecting means for locking said primary means to said secondary means or releasing them therefrom and a control mechanism to automatically control the operation of said connecting means.

5. An apparatus for transmitting power as embodied in claim 2 and including connecting means for locking said primary means to said secondary means or releasing them therefrom, and a control mechanism to automatically control the operation of said connecting means by centrifugal force.

6. An apparatus for transmitting power, having primary means driven by mechanical power and adapted to generate energy, secondary means capable of absorbing said energy, auxiliary means, means to transmit remaining part of energy not absorbed by said secondary means at overload to said auxiliary means, the latter capable of receiving said remaining parts of energy and transforming it into mechanical energy and transmitting said mechanical energy as turning moment back to said primary means, and means adapted to lock said auxiliary means to said primary means or release them therefrom.

7. An apparatus for transmitting power, the combination with a driving shaft, of a driven shaft, a primary member generating energy secured to said driving shaft, a secondary member capable of receiving said energy and attached to said driven shaft, an auxiliary driven member, means to transmit the remaining part of energy not absorbed by said secondary member directly back to said primary member and means to transmit another part of remaining energy to said auxiliary driven member, said auxiliary driven member mounted on said driving shaft, and a ratchet mechanism to lock said auxiliary driven member to said driving shaft or release it therefrom.

8. An hydraulic apparatus for transmitting power, having primary means adapted to generate energy in a fluid, secondary means capable of receiving energy from said energized fluid, auxiliary means, means to transmit remaining part of fluid energy not absorbed by said secondary means to said auxiliary means, the latter capable of receiving said remaining part of fluid energy and capable of transforming said remaining part of energy back to said primary means, and means carried by the primary means to effect coupling and uncoupling of said auxiliary means with respect to said primary means, said means being in frictional engagement with the primary means for the purpose of effecting coupling, when velocities of said primary and auxiliary means vary with respect to each other in the one direction, and uncoupling, when said velocities vary in the opposite direction.

9. An hydraulic apparatus for transmitting power, having stationary casing, fluid in said casing, a rotatable primary blade wheel with curved vanes adapted to transmit energy to said fluid, and a secondary rotatable blade wheel with curved vanes capable of receiving energy from said energized field, an auxiliary blade wheel, a guide wheel adapted to redirect the flow of said fluid to said auxiliary blade wheel, said auxiliary blade wheel capable of receiving the remaining energy from said fluid, at overload under control of the flow of said fluid, and adapted to transfer its own turning moment back to said primary blade wheel.

10. An hydraulic apparatus for transmitting power as embodied in claim 9 and including automatic means to effect coupling or uncoupling of said auxiliary and said primary blade wheels under the control of the flow of said fluid.

11. An hydraulic apparatus for transmitting power as embodied in claim 9 and including said primary blade wheel of variable diameter.

12. In a fluid device a casing, a fluid in said casing, rotatable blade wheels and stationary guide wheels in said casing, said guide wheels capable of imparting additional turning moment to the driving fluid, a fluid channel in said blade wheels and guide wheels, flexible and adjustable blades on said blade wheels capable of automatically under the control of the flow of said fluid diminishing the effective diameter and diminishing outlet area of said blade wheels upon increased flow.

13. In a fluid device, a stationary casing, fluid in said casing, rotatable blade wheels and guide wheels in said casing, a fluid channel in said blade wheels and said guide wheels, said guide wheels having a stationary portion integral with said casing and independently movable portions, concentric members carrying said movable portions, said stationary portion adapted to carry said members, said movable members being adapted to be locked to said stationary portion so as to be stationary or be released therefrom so as to rotate independently thereof, discharging angle of said stationary portion of said guide wheels being smaller than 15 degrees.

14. In a fluid device a stationary casing, fluid in said casing, rotatable blade wheels and guide wheels in said casing, a fluid channel in said blade wheels and guide wheels, said guide wheels having a stationary portion integral with said casing and independently movable portions, concentric members carrying said movable portions, said stationary portion adapted to carry said movable members, a ratchet mechanism to lock said movable members to said stationary portion or release them therefrom, discharging angle of said stationary portion of said guide wheels being smaller than 15 degrees.

15. An hydraulic apparatus for transmitting power as embodied in claim 9 and including a storage chamber, means to deliver automatically fluid from said storage chamber into said casing during operation, under the control of the sucking action due to centrifugal force of said rotating fluid in said casing, means for delivering said fluid into said storage chamber when apparatus is not in action, and means for cooling said operative fluid.

16. An hydraulic apparatus for transmitting or transforming power as embodied in claim 9 and including said secondary blade wheel having adjustable and flexible vanes slidably and pivotally fastened at one end to said wheel, but rigidly secured at the other end to said wheel.

17. In a hydraulic power transmission device, the combination with a primary shaft, of a secondary shaft coaxial with said primary shaft, and means for transmitting power from said primary shaft to said secondary shaft, comprising a centrifugal pump impeller mounted on said primary shaft, a turbine runner fastened to said secondary shaft, a casing containing fluid and enclosing said impeller and runner, and means for transmitting remaining fluid energy back to said primary shaft comprising: redirecting guide wheel juxtaposed to said turbine runner, an auxiliary turbine runner juxtaposed to said pump impeller and automatic ratchet mechanism for connecting or disconnecting said auxiliary turbine runner and said primary shaft according to their respective speeds, said impeller, said runner, said guide wheel and auxiliary runner having curved passages, which comprise the whole circuit, in which the said fluid is capable of circulating and power transmitting.

18. A hydraulic power transmission device as embodied in claim 17 and including said guide wheel comprising stationary and rotatable concentric sections, and a ratchet mechanism to lock said rotatable section to said stationary section according to the flow of circulating fluid.

19. A fluid power transmission device as embodied in claim 17 and including clutch for locking said pump impeller to said turbine runner or releasing it therefrom and a centrifugal clutch to control the operation of said clutch, said turbine runner and pump impeller designed with such dimension that the influence of centrifugal force upon the fluid in impeller and in runner are balanced when said impeller is locked to said runner, which way the fluid circulation is stopped.

In witness whereof I affix my signature.

JOSEPH JANDASEK.